United States Patent
Sacher et al.

(10) Patent No.: US 9,817,185 B2
(45) Date of Patent: Nov. 14, 2017

(54) PHOTONIC PLATFORM HAVING LIGHT-TRANSFERRING INTERLAYER TRANSITIONS

(71) Applicants: Huawei Technologies Canada Co., Ltd., Kanata (CA); The Governing Council of the University of Toronto, Toronto (CA)

(72) Inventors: Wesley David Sacher, Mississauga (CA); Joyce Kai See Poon, Toronto (CA)

(73) Assignee: The Governing Council of the University of Toronto, Toronto (CA)

(*) Notice: Subject to any disclaimer, the term of this patent is extended or adjusted under 35 U.S.C. 154(b) by 0 days.

(21) Appl. No.: 15/002,615

(22) Filed: Jan. 21, 2016

(65) Prior Publication Data
US 2017/0212304 A1 Jul. 27, 2017

(51) Int. Cl.
| G02B 6/26 | (2006.01) |
| G02B 6/122 | (2006.01) |
| G02B 6/12 | (2006.01) |

(52) U.S. Cl.
CPC ............ G02B 6/122 (2013.01); G02B 6/1228 (2013.01); G02B 2006/12038 (2013.01); G02B 2006/12061 (2013.01)

(58) Field of Classification Search
CPC .................. G02B 6/122; G02B 6/1228; G02B 2006/12038; G02B 2006/12061
USPC .......................................................... 385/43
See application file for complete search history.

(56) References Cited

U.S. PATENT DOCUMENTS

| 8,644,661 B2* | 2/2014 | Doerr ............... G02B 6/125 385/14 |
| 9,360,622 B2* | 6/2016 | Goodwill .......... G02B 6/125 |
| 2002/0159739 A1* | 10/2002 | Yang .............. G02B 6/12004 385/129 |

(Continued)

OTHER PUBLICATIONS

Huang, Ying, et al., "CMOS compatible monolithic multi-layer Si3N4-on-SOI platform for low-loss high performance silicon photonics dense integration," Optics Express, vol. 22, No. 18, pp. 21859-21865, 2014.

(Continued)

Primary Examiner — Ryan Lepisto
Assistant Examiner — Guy Anderson
(74) Attorney, Agent, or Firm — Gowling WLG (Canada) LLP

(57) ABSTRACT

A silicon photonic platform includes a substrate supporting a buried oxide layer, an active silicon layer deposited on the buried oxide layer, a first silicon nitride layer separated from the active silicon layer by a first spacer, the first silicon nitride layer and the active silicon layer constituting a first light-transferring interlayer transition and a second silicon nitride layer covered by a cladding and separated from the first silicon layer by a second spacer, the second silicon nitride layer and the first silicon nitride layer constituting a second light-transferring interlayer transition. The second silicon nitride layer passes over one or more waveguides in the active silicon layer to thereby define a waveguide crossing. The silicon nitride layers may be substituted with an equivalent dielectric with a similar refractive index and high optical transparency in the desired operating wavelength range.

22 Claims, 5 Drawing Sheets

(56) References Cited

U.S. PATENT DOCUMENTS

| | | | |
|---|---|---|---|
| 2003/0035613 A1* | 2/2003 | Huber | G02B 6/122 385/16 |
| 2004/0190830 A1* | 9/2004 | Rasras | G02B 6/124 385/39 |
| 2011/0255823 A1* | 10/2011 | Li | G02B 6/12002 385/14 |
| 2013/0051727 A1* | 2/2013 | Mizrahi | G02B 6/122 385/28 |
| 2013/0108208 A1* | 5/2013 | Doerr | G02B 6/125 385/14 |
| 2015/0077812 A1* | 3/2015 | Kato | H04N 1/2179 358/403 |
| 2015/0212268 A1* | 7/2015 | Goodwill | G02B 6/125 385/14 |
| 2016/0245999 A1* | 8/2016 | Goodwill | G02B 6/125 |
| 2016/0327751 A1* | 11/2016 | Wu | G02B 6/29344 |

OTHER PUBLICATIONS

Jones, Adam, et al., "Ultra-low crosstalk, CMOS compatible waveguide crossings for densely integrated photonic interconnection networks," Optics Express, vol. 21, No. 10, pp. 12002-12013, 2013.

Sherwood-Droz, Nicolás, et al., "Scalable 3D dense integration of photonics on bulk silicon," Optics Express, vol. 19, No. 18, pp. 17758-17765, 2011.

Bessette, Jonathan T., et al., "Vertically stacked microring waveguides for coupling between multiple photonic planes," Optics Express, vol. 21, No. 11, pp. 13580-13591, 2013.

Chen, Hui, et al., "Low-Loss Multimode-Interference-Based Crossings for Silicon Wire Waveguides," IEEE Photonics Technology Letters, vol. 18, No. 21, pp. 2260-2262, 2006.

Shang, Kuanping, et al., "Low-loss compact multilayer silicon nitride platform for 3D photonic integrated circuits," Optics Express, vol. 23, No. 16, pp. 21334-21342, 2015.

Sacher, Wesley D., et al., "Wide bandwidth and high coupling efficiency Si3N4-on-SOI dual-level grating coupler," Optics Express, vol. 22, No. 9, pp. 10938-10947, 2014.

Sacher, Wesley D., et al., "Polarization rotator-splitters and controllers in a Si3N4-on-SOI integrated photonics platform," Optics Express, vol. 22, No. 9, pp. 11167-11174, 2014.

Sacher, Wesley D., et al., "Multilayer Silicon Nitride-on-Silicon Integrated Photonic Platforms and Devices," Journal of Lightwave Technology, vol. 33, No. 4, pp. 901-910, 2015.

U.S. Appl. No. 61/822,531, "Silicon Nitride on Silicon-on-Insulator Integrated Photonic Circuit Platform and Integrated Photonic Elements," filed May 13, 2013.

* cited by examiner

PHOTONIC PLATFORM HAVING LIGHT-TRANSFERRING INTERLAYER TRANSITIONS

TECHNICAL FIELD

The present disclosure relates generally to silicon photonics and, more particularly, to silicon photonic platforms or material layer stacks.

BACKGROUND

Silicon photonics is an emerging technology that enables fabrication of fast, low-cost and high-density photonic devices for a variety of uses and applications, notably in relation to optical network switching. Photonic switch fabrics, which are capable of switching optical signals without conversion to the digital domain, are an area of particular interest.

A silicon photonic switch typically incorporates a number of optical waveguides of varying lengths, multiple optical switch cells, and multiple waveguide crossings having intersecting waveguides.

A silicon photonic device, such as a silicon photonic switch, can be fabricated using a commercially available "silicon-on-insulator" (SOI) wafer composed of a thin layer of silicon (typically 150-350 nm thick) disposed on a layer of buried oxide (e.g. silicon dioxide) which is, in turn, supported on a silicon substrate typically several hundred micrometers thick. The fabrication of photonic devices requires a number of steps that include, for example, chemical vapor deposition and patterning of layers to from waveguides using lithography and etching.

The commercially viable implementation of a silicon photonic switch fabric imposes demanding requirements in terms of optical performance (e.g. insertion loss, crosstalk) and optical component density. In a silicon photonic switch matrix, the insertion loss can be attributed primarily to a small number of sources: fiber-to-integrated-circuit coupling loss, waveguide scattering loss, switch cell insertion loss, and waveguide crossing loss. Waveguide crossings are necessary in switch fabrics. In large switch fabrics, there may be a significant number of waveguide crossings which cause losses and crosstalk. In silicon photonics, the waveguide scattering loss is relatively high, i.e. approximately 2 dB/cm for strongly confining strip waveguides. In a large switch matrix, therefore, long optical paths can cause a large scattering loss to accumulate, and many crossings can cause crosstalk to accumulate.

There is accordingly a need in silicon photonics for lower loss and low crosstalk yet broadband waveguide crossings which enable different parts of a very large-scale photonic circuit to be interconnected in complex ways.

SUMMARY

The following presents a simplified summary of some aspects or embodiments of the invention in order to provide a basic understanding of the invention. This summary is not an extensive overview of the invention. It is not intended to identify key or critical elements of the invention or to delineate the scope of the invention. Its sole purpose is to present some embodiments of the invention in a simplified form as a prelude to the more detailed description that is presented later.

The present specification discloses a silicon photonic platform or material layer stack that includes an active silicon layer and two silicon nitride layers, all of which function as optical transport layers within the platform or stack. Coupling light from the silicon layer to the two elevated silicon nitride layers and then back to the silicon layer enable low-loss waveguide crossings, making this arrangement particularly useful for photonic switches.

One inventive aspect of the disclosure is a silicon photonic platform that includes a substrate supporting a buried oxide layer, an active silicon layer deposited on the buried oxide layer, a first waveguide layer (e.g. a first silicon nitride layer) separated from the active silicon layer by a first spacer, the first waveguide layer and the active silicon layer constituting a first light-transferring interlayer transition and a second waveguide layer (e.g. second silicon nitride layer) separated from the first waveguide layer by a second spacer, the first waveguide layer and the second waveguide layer constituting a second light-transferring interlayer transition. The second waveguide layer passes over one or more waveguides in the active silicon layer to thereby define a waveguide crossing.

Another inventive aspect of the disclosure is a photonic switch including a substrate supporting a buried oxide layer, an active silicon layer deposited on the buried oxide layer, a first waveguide layer (e.g. first silicon nitride layer) separated from the active silicon layer by a first spacer, the first waveguide layer and the active silicon layer defining a first interlayer transition across which light couples, and a second waveguide layer (e.g. a second silicon nitride layer) separated from the first waveguide layer by a second spacer, the first waveguide layer and the second waveguide layer defining a second interlayer transition across which light couples. The second waveguide layer traverses one or more waveguides in the active silicon layer to thereby define a waveguide crossing.

BRIEF DESCRIPTION OF THE DRAWINGS

These and other features of the disclosure will become more apparent from the description in which reference is made to the following appended drawings.

DETAILED DESCRIPTION OF EMBODIMENTS

Figure 1:
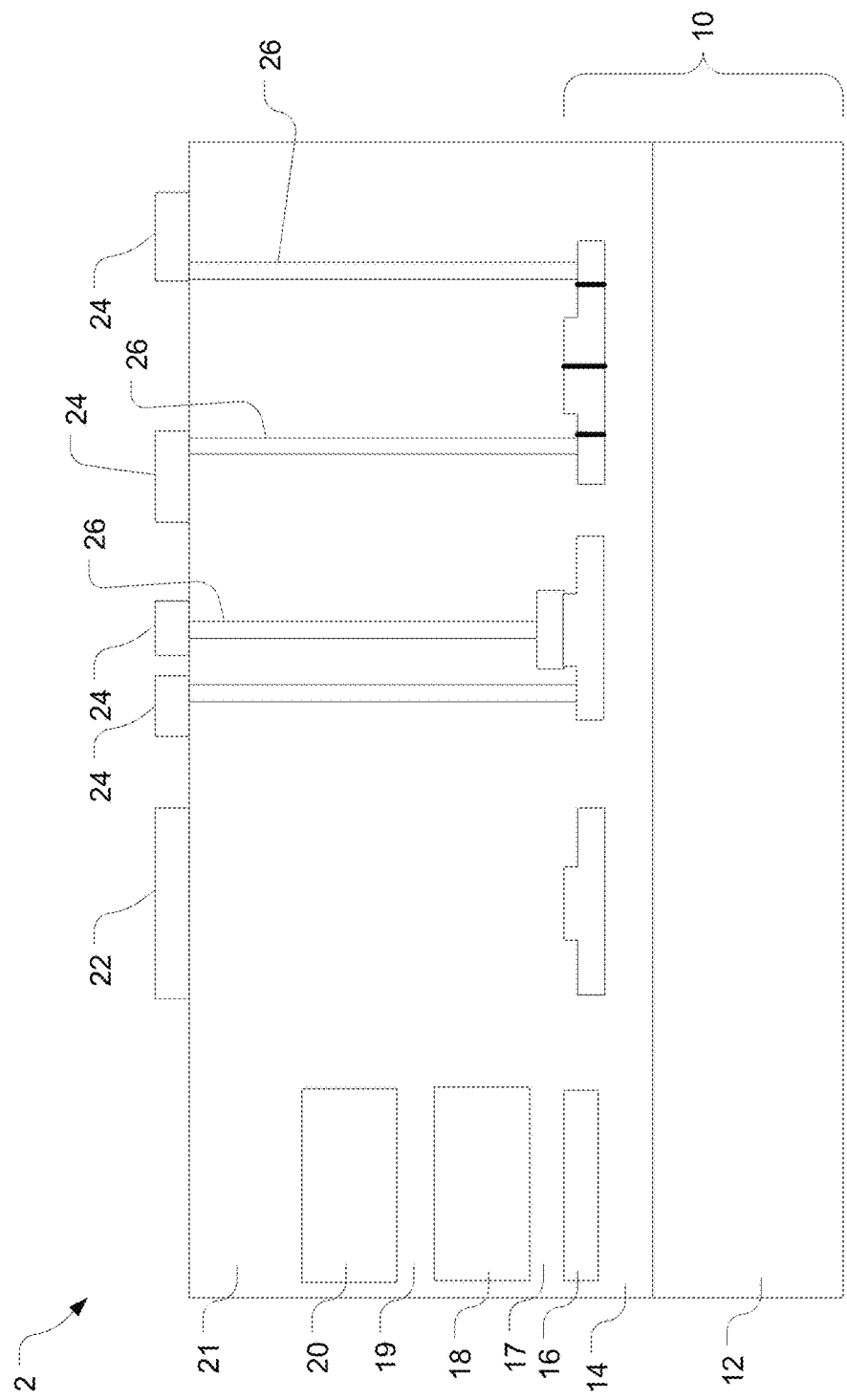
FIG. 1 depicts a silicon photonic platform in accordance with an embodiment of the present invention.

The following detailed description contains, for the purposes of explanation, numerous specific embodiments, implementations, examples and details in order to provide a thorough understanding of the invention. It is apparent, however, that the embodiments may be practiced without these specific details or with an equivalent arrangement. In other instances, some well-known structures and devices are shown in block diagram form in order to avoid unnecessarily obscuring the embodiments of the invention. The description should in no way be limited to the illustrative implementations, drawings, and techniques illustrated below, including the exemplary designs and implementations illustrated and described herein, but may be modified within the scope of the appended claims along with their full scope of equivalents.

In the embodiment illustrated in the figures, and as will be described below in greater detail, the silicon photonic platform includes at least two silicon nitride light-guiding layers (optical transport layers or waveguides) disposed above an active silicon light-guiding layer, which are hereinafter referred to more succinctly as the "active silicon layer" and the "silicon nitride layers". Waveguides fabricated from silicon nitride (SiN) have been found to exhibit much lower propagation loss than silicon nanowire waveguides. The silicon nitride layer that is immediately above the active silicon layer is referred to as the first silicon nitride layer. The silicon nitride layer immediately above the first silicon nitride layer is referred to as the second silicon nitride layer. The first and second silicon nitride layers may be separated from the silicon layer and from themselves by buffer layers (i.e. spacers or separation layers) of silicon dioxide or another suitably low refractive index material. Interlayer transitions are implemented between two immediately consecutive layers using, for example, adiabatic tapers, in which the "source" waveguide is tapered down to a small tip, while in the same span the "target" waveguide is tapered up from a small tip to the desired waveguide width for that layer. Low-loss interlayer transitions route the propagating signal from the silicon layer to the first nitride layer and back to the silicon layer. The low-loss routing is implemented when the projected loss in the silicon layer exceeds the projected loss of two interlayer transitions and the projected loss of the silicon nitride waveguide over the target routing distance. Waveguide crossings are implemented using two interlayer transitions to connect the silicon waveguide layer to the second nitride layer, using the first silicon nitride layer as an intermediate layer, and routing the second silicon nitride layer waveguide above one or a series of waveguides in the silicon layer. The multi-layer waveguide crossing (which can be thought of as an "overpass") is advantageously implemented when the sum of the insertion losses of a series of single-layer crossings (which in the prior art would be implemented in the silicon layer) exceeds the projected loss from the four relevant interlayer transitions (i.e. silicon to first silicon nitride, first silicon nitride to second silicon nitride, second silicon nitride back to first silicon nitride, and first silicon nitride back to silicon) plus the loss from the corresponding multi-layer crossings (which are very low but non-zero).

In the embodiment depicted by way of example in FIG. 1, a silicon photonic platform (or "stack" or "integrated photonic platform") is denoted by reference numeral 2. The photonic platform 2 includes a silicon-on-insulator (SOI) wafer 10 composed of a silicon (Si) substrate 12 supporting a buried oxide layer 14 which may be formed of silica ($SiO_2$) or any equivalent insulating material. In other embodiments, the substrate supporting the buried oxide layer may be formed of another suitable material. The platform 2 includes an active silicon layer 16 deposited on the buried oxide layer 14. The active silicon layer 16 is an optical transport layer capable of conducting light. This silicon layer is said to be active as it actively transports light unlike the (passive) silicon substrate which does not transport light. The platform 2 includes two additional light-guiding layers (optical transport layers) made of silicon nitride (hereinafter denoted "SiN" although it will be appreciated that the SiN may be mainly of the form of $Si_xN_y$, including stoichiometric silicon nitride, $Si_3N_4$). As shown by way of example in the figure, the platform 2 includes a first silicon nitride layer 18 separated from the active silicon layer by a first spacer (or separation layer) 17. The first silicon nitride layer 18 and the active silicon layer 16 constitute a first light-transferring interlayer transition. The platform 2 also includes a second silicon nitride layer 20 that is optionally covered by a cladding 21. The second silicon nitride layer 20 is separated from the first silicon layer 18 by a second spacer (or separation layer) 19. The second silicon nitride layer 20 and the first silicon nitride layer 18 constitute a second light-transferring interlayer transition. The platform may also include a heater, e.g. a TiN metal heater 22 and a plurality of top contacts 24 and metal vias 26. The platform may also include one or more include germanium photodiodes and/or PN junctions for modulators. In the illustrated embodiment, the buried oxide layer, the first spacer (first separation layer), the second spacer (second separation layer) and the cladding are all made of silica although it will be appreciated that other suitable materials may be utilized.

The layers of the photonic platform (stack) 2 thus define optical waveguides at different layer depths (i.e. different heights or vertical levels) that are supported directly or indirectly by the silicon substrate. The layers of silicon nitride, silicon and silica may be deposited on the SOI wafer using various existing CMOS-compatible fabrication techniques, e.g. chemical vapor deposition (CVD), lithography and etching. Layers may be deposited onto the SOI wafer using front-end-of line (FEOL) processes to form a FEOL layer stack or back-end-of-line (BEOL) processes to form a BEOL layer stack.

In the embodiment illustrated in FIG. 1, the first and second silicon nitride layers 18, 20 are thicker than the active silicon layer 16. The first and second silicon nitride layers 18, 20 in this embodiment are also thicker than the first and second spacers (separation layers) 17, 19.

In one embodiment, the first and second silicon nitride layers 18, 20 are twice as thick as the first and second spacers 17, 19. In one embodiment, the first and second silicon nitride layers 18, 20 are equally thick. In one embodiment, the first and second spacers 17, 19 are equally thick. In another embodiment, the second spacer (second separation layer) 19 is thicker than the first spacer (second separation layer) 17.

In one specific embodiment of the platform, which has been optimized for a wavelength of 1310 nm, each of the first and second silicon nitride layers has a thickness of 400 nm +/−20%, the buried oxide layer has a thickness of 2-3 μm +/−20%, each of the first and second spacers has a thickness of 200 nm +/−20% and the active silicon layer has a thickness of 150 nm +/−20%. In one embodiment, the active silicon layer may be a partially etched slab having sides portions that are thinner than a central portion. The side portions of the slab may have a thickness of 65 nm +/−20% while the central portion has a thickness of 150 nm +/−20%.

In another specific embodiment of the platform, which has been optimized for a wavelength of 1550 nm, each of the first and second silicon nitride layers also has a thickness of 400 nm +/−20%, the buried oxide layer has a thickness of 2 μm +/−20%, the first spacer has a thickness of 200 nm +/−20%, the second spacer has a thickness of 360 nm +/−20% and the active silicon layer has a thickness of 220 nm +/−20%. In one embodiment, the active silicon layer may be a partially etched slab having sides portions that are thinner than a central portion. The side portions of the slab may have a thickness of 90 nm +/−20% while the central portion has a thickness of 220 nm +/−20%.

The active silicon layer 16, the first silicon nitride layer 18 and the second silicon nitride layer 20 function as three levels of optical transport layers that cooperate to transmit light from the active silicon layer up to the second nitride layer and then back to the silicon layer. As such, these optical transport layers act as steps, each disposed a different depth, that cause the light to ascend to a higher level or to descend to a lower level. This arrangement of step-like levels thus enables vertical transmission of light, thereby functioning to some extent like an optical via. This technology can be exploited to efficiently conduct light over one or more waveguides. In other words, the step-like layers can be used to construct a low-loss, low-crosstalk waveguide crossing, which is particularly useful in the context of fabricating low-loss, low-crosstalk photonic switch fabrics.

Figure 2:
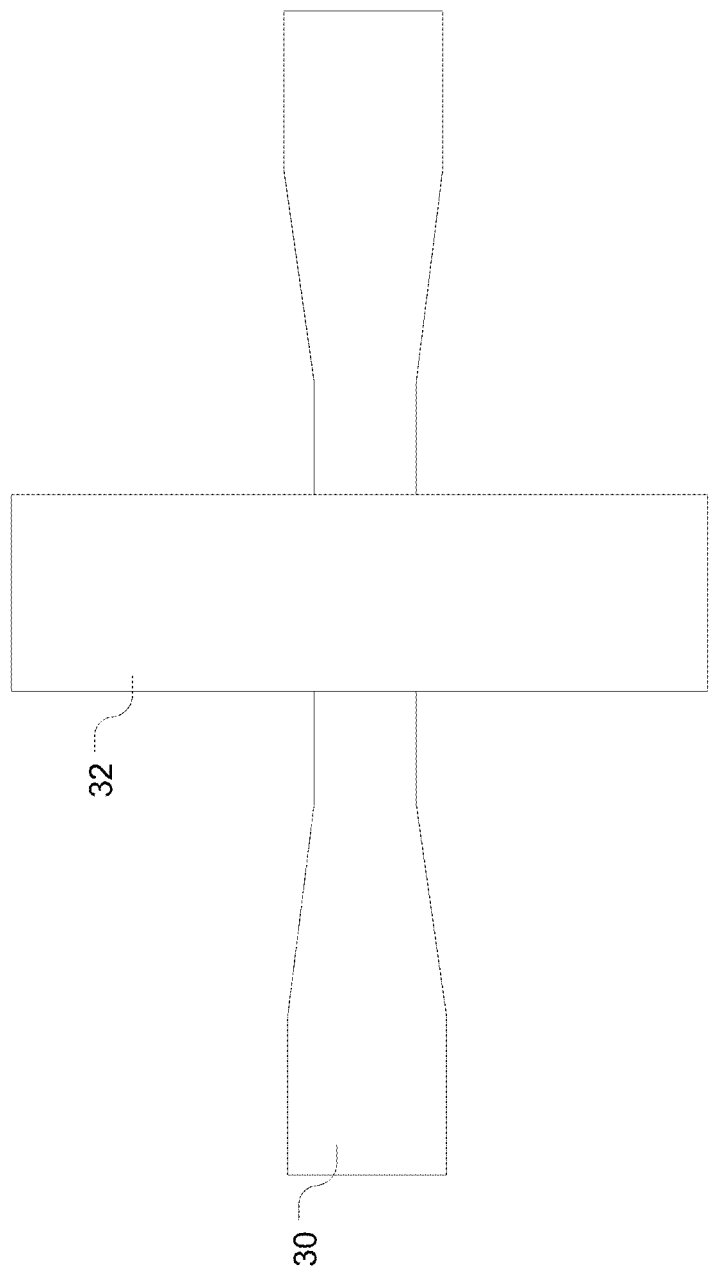
FIG. 2 is a top view of an orthogonal waveguide crossing.

FIG. 2 depicts a waveguide crossing composed of a silicon waveguide 30 and a silicon nitride waveguide 32 passing over the silicon waveguide 30, thus defining a low-loss, low-crosstalk "overpass". The silicon waveguide 30 is orthogonal to the silicon nitride waveguide 32. An orthogonal crossing angle minimizes crosstalk; however, a non-orthogonal crossing angle, though suboptimal, may still be used in other embodiments. Waveguide crossings using only a single silicon nitride layer over the active silicon layer exhibit limited performance. The explanation can be summarized as follows. In order to couple light into the single silicon nitride layer, the silicon and silicon nitride layers must be close enough to interact. If they are close enough to interact, then this leads to performance limitations on the crossings. The double layer of silicon nitride enables light to be coupled while augmenting the gap between the silicon nitride and the silicon waveguide crossing underneath the span of silicon nitride.

Figure 3:
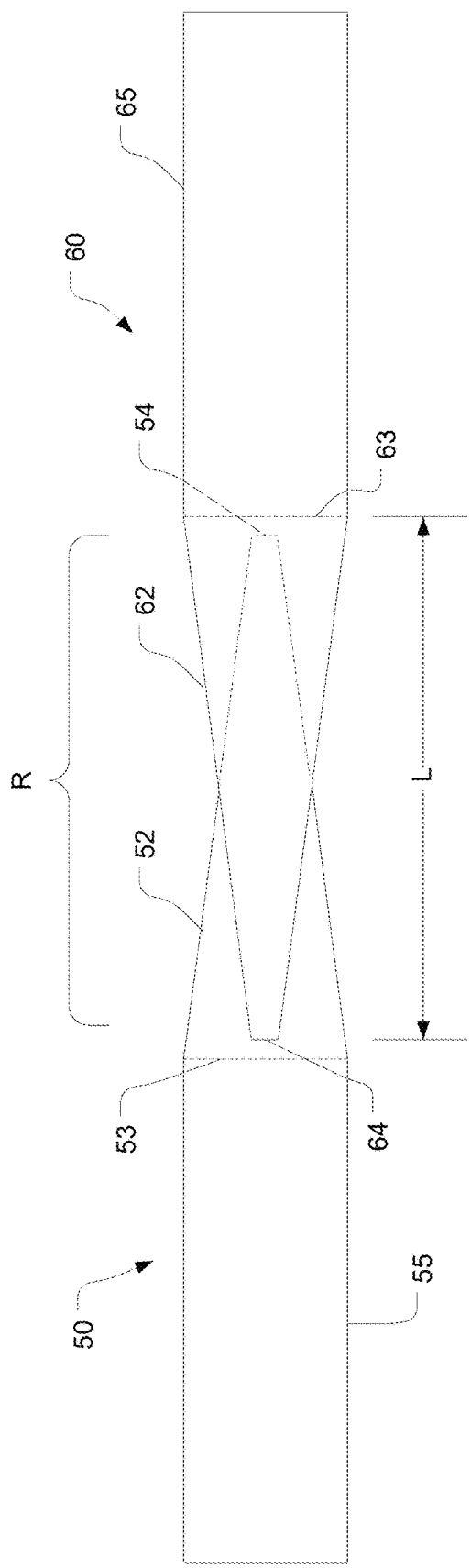
FIG. 3 depicts an adiabatic interlayer transition between a first waveguide and a second waveguide.

FIG. 3 depicts an interlayer transition between a first waveguide 50 and a second waveguide 60 that is slightly vertically offset from the first waveguide 50. This transition may be between the active silicon layer and the first silicon nitride layer or between the first and second silicon nitride layers. In the illustrated embodiment of FIG. 3, the first waveguide 50 is a lower waveguide and the second waveguide 60 is an upper waveguide.

In some embodiments, the first waveguide 50 has a first tapered end section 52 that at least partially overlies a corresponding second tapered end section 62 of the second waveguide 60 within an overlap region R. The first tapered end section 52 may be coupled to, or formed integrally with, a channel or strip waveguide section of the first waveguide 50 at a waveguide interface 53 between a first waveguide section 55 and the first tapered end section 52. Similarly, the second tapered end section 62 of the second waveguide 60 may be coupled to, or formed integrally with, a corresponding channel or strip waveguide section at a waveguide interface 63 between the second tapered end section 62 and a second waveguide section 65.

Within the overlap region R, the tapered end sections 52, 62 may be substantially axially aligned in a linear direction defined by the waveguide sections and are disposed at different layer depths so as to be at least partially overlapping. The first tapered end section 52 narrows in width from a first width at the waveguide interface 53, which may in some cases be substantially equal to a width of waveguide section 55, to a second width at a first end facet 54 or "tip". The second tapered end section 62 also narrows from a first width at the waveguide interface 63 to a second width at the second end facet 64 or tip, but in an opposite direction to the first tapered end section. Thus, in a given linear direction, one of the tapered end sections 52, 62 is decreasing in width while the other of the tapered end sections 52, 62 is increasing in width. In some embodiments, the tapered end sections 52, 62 have substantially equal lengths and are both laterally (e.g., side-to-side in the linear direction) and axially (e.g., end-to-end-in the linear direction) aligned. In some embodiments, the end facet 64 of the second waveguide 60 may lie substantially above the waveguide interface 53 of the first waveguide and likewise the end facet 54 of the first waveguide 50 may lie substantially underneath the waveguide interface 63 of the second waveguide 60. Alternatively, as shown in FIG. 3, the first end facet 54 may be slightly horizontally offset from the second waveguide interface 63 and the second end facet 64 may be slightly horizontally offset from the first waveguide interface 53.

However, the tapered end sections 52, 62 may in other cases not have substantially equal lengths or be aligned, either laterally or axially, or both, within the overlap region. Different sizes ratios and/or spatial orientations of the tapered end sections may be implemented depending on the particular use or application of the photonic platform.

In the embodiment depicted by way of example in FIG. 3, the interlayer transitions between the first (lower) waveguide 50 and the second (upper) waveguide 60 may have adiabatic tapers. An adiabatic taper enables an adiabatic mode transformation across the interlayer transition. An adiabatic mode transformation transfers the propagating optical energy from one mode to another, which is induced by the changing geometry of the waveguide in which the optical energy is confined, but does not affect the mode order, e.g. a $TM_0$ to $TE_1$ transformation, a $TE_1$ to $TE_0$ transformation, etc. The adiabatic tapers, as shown by way of example in FIG. 3, taper linearly toward each other to form a symmetrical and laterally aligned geometry for the interlayer transition. A taper length L of 100-150 μm has been found to provide a low-loss interlayer transition. The optical loss of the interlayer transition is also affected by the size of the waveguide tips (end facets). It is desirable to make the tips as small as possible.

In some embodiments, the tapered end sections 52, 62 are spaced apart vertically by a relatively small distance as defined by a layer thickness of the separation layer (or spacer layer) formed between the tapered end sections 52, 62. For example, the separation layer may be formed in the photonic platform with a thickness of approximately 50 nanometers or some other thickness within a range of thicknesses that includes 50 nanometers, such as between about 20 and 80 nanometers. Due to their relatively close vertical proximity, on account of the small thickness of the separation layer, the first and second tapered end sections constitute a composite waveguide (interlayer transition) that transfers light in either direction between the first and second waveguides. Thus, for example, an optical mode propagating (e.g., from left-to-right) in the first waveguide section 50 is coupled into the tapered end section 52, which gradually narrows in width as the second tapered end section gradually widens. Gradual tapering allows the propagating optical mode to transform in the direction of propagation within the overlap region R from a mode that may be carried in the first waveguide to a mode that may be carried in the second waveguide. In this manner, optical modes initially being conducted by the first waveguide may be transferred or re-distributed into the second waveguide and vice versa. The photonic platform thus behaves bi-directionally. In order to efficiently transfer light between the first and second waveguides 50, 60, the first and second tapered end sections 52, 62 may be shaped so that each respective width transition is adiabatic in nature. For example, in some embodiments, the first tapered end section may have a width of between about 700 and 1500 nanometers at the waveguide interface, tapering down to a width not exceeding about 300 nanometers at the end facet, in some cases, between about 140 and 180 nanometers, while in other cases, depending on the lithographic and fabrication resolution of the process or processes used to fabricate the photonic platform, less than 140 nanometers. To ensure a gradual enough width transition that encourages adiabatic transformation of optical modes, the first tapered end section may also have a length of between about 5 and 500 micrometers, or in some cases between about 5 and 100 micrometers. Similar to the first tapered end section, the second tapered end section 62 may have a shape configuration that encourages adiabatic transformation of optical modes. Thus, for example, in some embodiments, the second tapered end section may have a width of between about 400 and 700 nanometers at waveguide interface, which narrows down to a width not exceeding about 250 nanometers at the end facet, in some cases, between about 140 and 180 nanometers, while in other cases, as permitted by lithographic and fabrication resolution, less than 140 nanometers. To ensure a gradual enough width transition that encourages adiabatic transformation of optical modes, the second tapered end section 62 may also have a length of between about 5 and 500 micrometers, or in some cases between about 100 and 150 micrometers. In some cases, the first and second tapered end sections 52, 62 may have substantially the same length.

In some embodiments, the first and second waveguides 50, 60 may have different layer thicknesses. For example, the first tapered end section, first waveguide section, and end facet may each have a layer thickness of approximately 400 nanometers or some other thickness within a range that includes 400 nanometers, such as between about 300 and 500 nanometers. The second tapered end section, second waveguide section, and second end facet may each have a layer thickness of approximately 150 nanometers or some other thickness within a range that includes 150 nanometers, such as between about 100 and 200 nanometers. However, other dimensions not within the example ranges specifically described may be possible as well depending on the particular use or application of the photonic platform.

Figure 4:
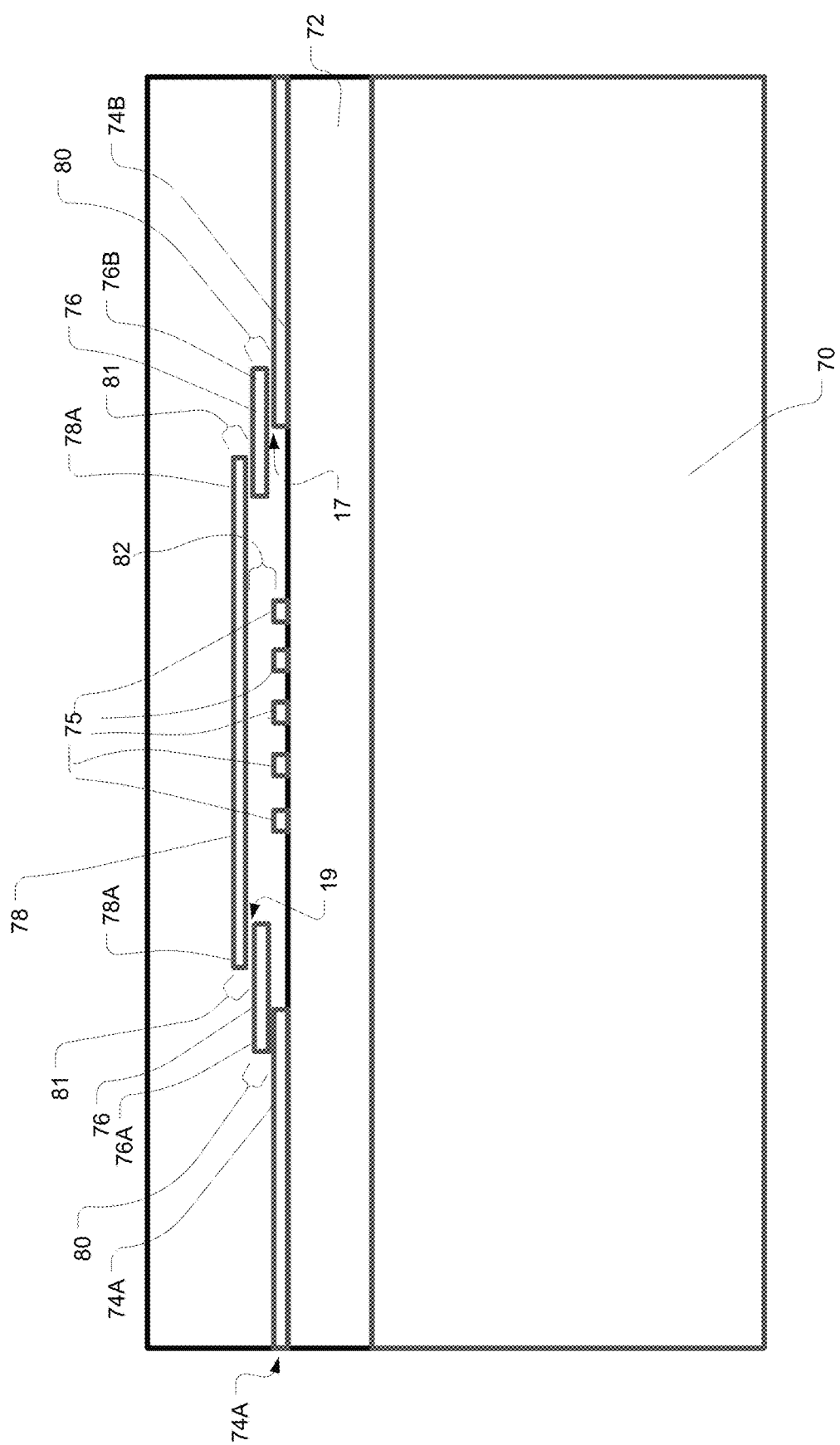
FIG. 4 depicts a photonic platform having waveguide crossings in which a second silicon nitride layer passes over silicon waveguides of an active silicon layer.

FIG. 4 depicts a photonic platform having low-loss, low-crosstalk waveguide crossing formed by disposing a second silicon nitride layer over silicon waveguides. In the embodiment depicted in FIG. 4, the platform is composed of a stack of layers, namely a silicon substrate 70 onto which a buried oxide layer 72 is deposited. An active silicon layer 74 is deposited on the buried oxide layer. One or more silicon waveguides 75 are formed on the buried oxide layer at the same depth as the active silicon layer. In the embodiment illustrated by way of example in FIG. 4, there are five silicon waveguides 75; however, it will be appreciated other embodiments may have a different number of waveguides 75. Although the silicon waveguides 75 are equally spaced, it will be appreciated that this is not necessarily so in other embodiments. In the embodiment shown in FIG. 4, the platform includes a first silicon nitride layer 76 that partially overlaps the active silicon layer 74 at a first interlayer transition 80. As further illustrated in FIG. 4, a second silicon nitride layer 78 partially overlaps the first silicon nitride layer 76 at a second interlayer transition 81. As shown in FIG. 4, the second silicon nitride layer spans the five silicon waveguides 75. A vertical gap 82 between the second silicon nitride layer and the waveguides 75 is significantly larger than the vertical space between the interlayer transitions. The gap 82 is sufficiently large that only inconsequential amounts of loss and crosstalk are exhibited.

The second silicon nitride layer 78 thus acts as an overpass that crosses or traverses the silicon waveguides 75 without significant loss or crosstalk. This two-step overpass design can be used to fabricate photonic switches in which low-loss, low-crosstalk waveguide crossings are highly desirable. In the embodiment illustrated in FIG. 4, the active silicon layer 74 has a first silicon waveguide 74A, a second silicon waveguide 74B and a third silicon waveguide 75. As illustrated, the first silicon waveguide 74A and the second silicon waveguide 74B are disposed on opposite sides of the third silicon waveguide 75. As shown in the illustrated embodiment, there may be a plurality of third silicon waveguides 75. The third silicon waveguide(s) 75 may be orthogonal to the first and second silicon waveguides 74A, 74B. The first light-transferring interlayer transition 80 includes first and second waveguide sections 76A, 76B in the first waveguide layer 76. The first waveguide section 76A is optically coupled to the first silicon waveguide 74A through the first spacer 17. The second waveguide section 76B is optically coupled to the second silicon waveguide 74B through the first spacer 17. The second light-transferring interlayer transition 81 includes a third waveguide section 78A in the second waveguide layer 78. The third waveguide section 78A is optically coupled at its opposed ends to the first and second waveguide sections 76A, 76B through the second spacer 19, so as to optically couple the first and second silicon waveguides 74A, 74B over and across the third silicon waveguide(s) 75. In the illustrated embodiment, the first and second waveguide sections 76A, 76B each have tapered ends for adiabatic optical coupling to the respective first and second silicon waveguides 74A, 74B. In this embodiment, the third waveguide section 78A has tapered ends for adiabatic optical coupling to the respective first and second waveguide sections 76A, 76B.

In another embodiment, the photonic platform may be a multi-layer stack that includes more than two silicon nitride layers in addition to the active silicon layer. For example, a further embodiment of the platform may have a third silicon nitride layer spanning the silicon waveguides. It will be appreciated that other embodiments may be created with additional silicon nitride layers to further elevate the light using the same fundamental concept.

Figure 5:
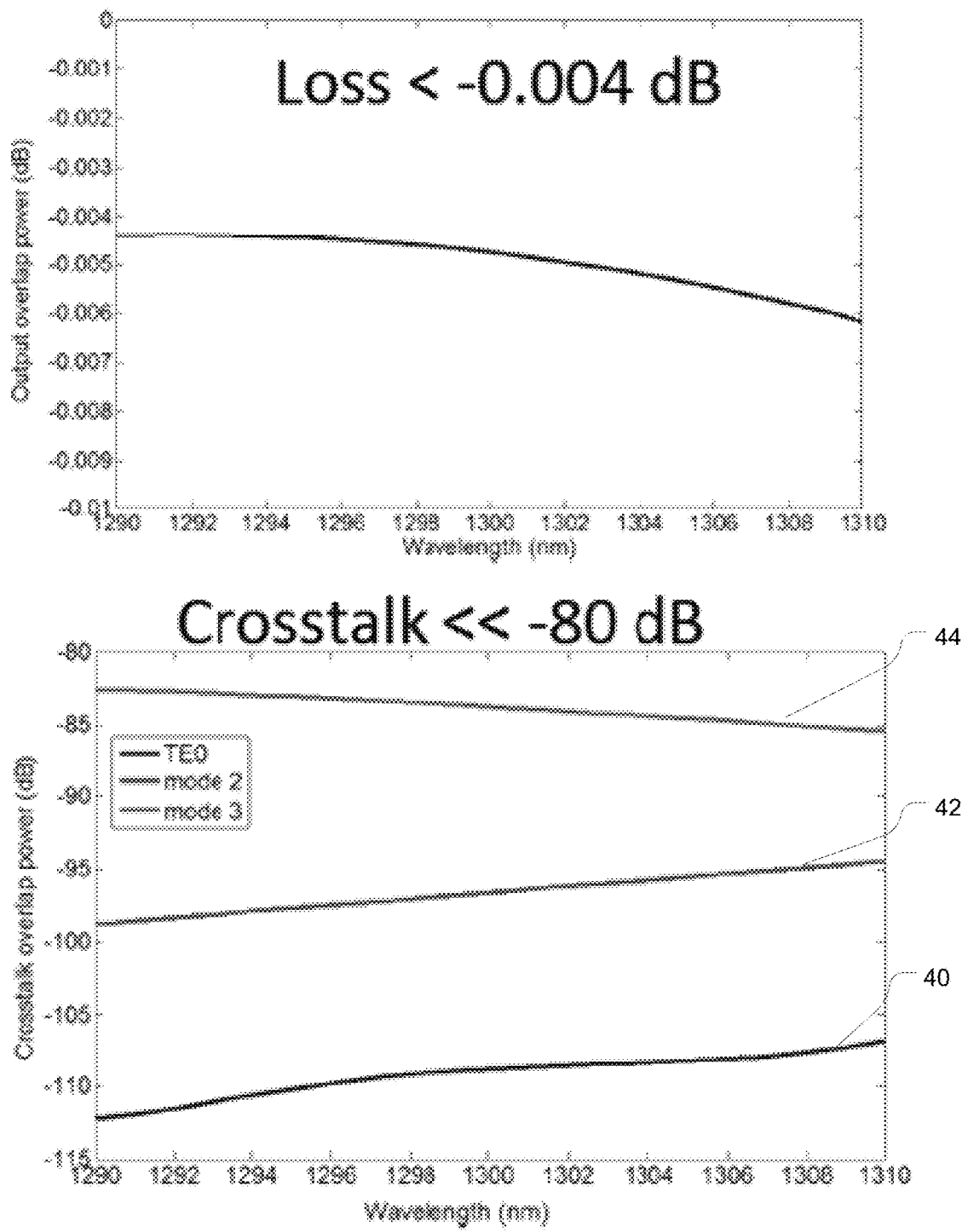
FIG. 5 presents two graphs showing the simulated loss and crosstalk of a waveguide crossing for a photonic platform optimized for the wavelengths near 1310 nm (i.e., the "O" optical communication band).

FIG. 5 presents two graphs showing the simulated performance of a waveguide crossing constructed using the dimensions and parameters described above for the photonic platform optimized for an operating wavelength of 1310 nm. The graphs in FIG. 5 show that, for an equivalent length, losses of less than −0.004 dB are achieved in the 1290-1310 nm range. For this same wavelength range, crosstalk less than −80 dB is achieved for $TE_0$ (the plot denoted by reference numeral 40), for mode 2 (denoted by reference numeral 42) and for mode 3(denoted by reference numeral 44). The graphs of FIG. 5 demonstrate that the platform exhibits sufficiently low loss and crosstalk to make it highly suitable for a photonic switch.

Although silicon nitride has been demonstrated to perform well as the first and second waveguide layers, it will be appreciated that another material with a refractive index that is suitably higher than the cladding and can be deposited uniformly over the substrate can be used as the first and second waveguide layers. Some materials that are believed to function equivalently include metal oxides, such as $TiO_2$, $ZrO_2$ and $Ta_2O_5$, since they have similar refractive indices to silicon nitride around the wavelengths of 1310 nm and 1550 nm, as well as a high optical transparency in these wavelength bands. It is expected that the first and second waveguide layers may be made of any dielectric material having a refractive index within +/−20% of the refractive index of silicon nitride. Thus, the first and second waveguide layers may be made of silicon nitride or another suitable material such as, for example, $TiO_2$, $ZrO_2$ and $Ta_2O_5$.

It is to be understood that the singular forms "a", "an" and "the" include plural referents unless the context clearly dictates otherwise. Thus, for example, reference to "a device" includes reference to one or more of such devices, i.e. that there is at least one device. The terms "comprising", "having", "including", "entailing" and "containing", or verb tense variants thereof, are to be construed as open-ended terms (i.e., meaning "including, but not limited to,") unless otherwise noted. All methods described herein can be performed in any suitable order unless otherwise indicated herein or otherwise clearly contradicted by context. The use of examples or exemplary language (e.g. "such as") is intended merely to better illustrate or describe embodiments of the invention and is not intended to limit the scope of the invention unless otherwise claimed.

While several embodiments have been provided in the present disclosure, it should be understood that the disclosed systems and methods might be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the inventive concept(s) disclosed herein.

The invention claimed is:

1. A silicon photonic platform comprising:
   a substrate supporting a buried oxide layer;
   an active silicon layer on the buried oxide layer;
   a first waveguide layer separated from the active silicon layer by a first spacer, the first waveguide layer and the active silicon layer constituting a first light-transferring interlayer transition; and
   a second waveguide layer separated from the first waveguide layer by a second spacer, the first waveguide layer and the second waveguide layer constituting a second light-transferring interlayer transition,
   wherein the active silicon layer comprises first, second and third silicon waveguides, wherein the first and second silicon waveguides are disposed on opposite sides of the third silicon waveguide;
   wherein the first light-transferring interlayer transition comprises first and second waveguide sections in the first waveguide layer, wherein the first waveguide section is optically coupled to the first silicon waveguide through the first spacer, and wherein the second waveguide section is optically coupled to the second silicon waveguide through the first spacer; and
   wherein the second light-transferring interlayer transition comprises a third waveguide section in the second waveguide layer, wherein the third waveguide section is optically coupled at its opposed ends to the first and second waveguide sections through the second spacer, so as to optically couple the first and second silicon waveguides over and across the third silicon waveguide.

2. The platform of claim 1 wherein the first waveguide layer is a first silicon nitride layer and the second waveguide layer is a second silicon nitride layer.

3. The platform of claim 1 wherein the first and second waveguide layers are made of a dielectric material having a refractive index within +/−20% of the refractive index of silicon nitride.

4. The platform of claim 2 wherein the second silicon nitride layer passes over one or more waveguides in the active silicon layer to thereby define a waveguide crossing.

5. The platform of claim 2 wherein the interlayer transitions comprise adiabatic tapers.

6. The platform of claim 5 wherein the adiabatic tapers have a taper length of 50 to 150 μm.

7. The platform of claim 2 wherein the substrate is made of silicon and wherein the buried oxide layer, the first spacer, the second spacer and the cladding are made of silica.

8. The platform of claim 2 wherein the first and second silicon nitride layers are thicker than the active silicon layer.

9. The platform of claim 2 wherein the first and second silicon nitride layers are thicker than the first and second spacers.

10. The platform of claim 2 wherein the first and second spacers are equally thick.

11. The platform of claim 2 wherein the buried oxide layer has a thickness of 2-3 μm +/−20%.

12. The platform of claim 2 wherein each of the first and second spacers has a thickness of 200 nm +/−20% and wherein the active silicon layer has a thickness of 150 nm +/−20%.

13. The platform of claim 2 wherein at least one of the first and second silicon nitride layers is partially etched.

14. The platform of claim 1, wherein the first and second waveguide sections each comprise tapered ends for adiabatic optical coupling to the respective first and second silicon waveguides.

15. The platform of claim 14, wherein the third waveguide section comprises tapered ends for adiabatic optical coupling to the respective first and second waveguide sections.

16. A photonic switch comprising:
   a substrate supporting a buried oxide layer;
   an active silicon layer on the buried oxide layer;
   a first waveguide layer separated from the active silicon layer by a first spacer, the first waveguide layer and the active silicon layer defining a first interlayer transition across which light couples; and
   a second waveguide layer separated from the first waveguide layer by a second spacer, the first waveguide layer and the second waveguide layer defining a second interlayer transition across which light couples, wherein the second waveguide layer traverses one or more waveguides in the active silicon layer to thereby define a waveguide crossing,
   wherein the active silicon layer comprises first, second and third silicon waveguides, wherein the first and second silicon waveguides are disposed on opposite sides of the third silicon waveguide;
   wherein the first light-transferring interlayer transition comprises first and second waveguide sections in the first waveguide layer, wherein the first waveguide section is optically coupled to the first silicon waveguide through the first spacer, and wherein the second waveguide section is optically coupled to the second silicon waveguide through the first spacer; and wherein the second light-transferring interlayer transition comprises a third waveguide section in the second waveguide layer, wherein the third waveguide section is optically coupled at its opposed ends to the first and second waveguide sections through the second spacer, so as to optically couple the first and second silicon waveguides over and across the third silicon waveguide.

17. The switch of claim 16 wherein the first waveguide layer is a first silicon nitride layer and wherein the second waveguide layer is a second silicon nitride layer.

18. The switch of claim 17 wherein the interlayer transitions comprise adiabatic tapers.

19. The switch of claim 18 wherein the adiabatic tapers have a taper length of 100 to 150 μm.

20. The switch of claim 17 wherein the first and second silicon nitride layers are thicker than the active silicon layer.

21. The switch of claim 17 wherein each of the first and second silicon nitride layers has a thickness of 400 nm +/−20% and wherein the buried oxide layer has a thickness of 2-3 μm.

22. The switch of claim 16 wherein the first and second waveguide layers are made of a dielectric material having a refractive index within +/−20% of the refractive index of silicon nitride.

* * * * *

UNITED STATES PATENT AND TRADEMARK OFFICE
CERTIFICATE OF CORRECTION

| | | |
|---|---|---|
| PATENT NO. | : 9,817,185 B2 | Page 1 of 1 |
| APPLICATION NO. | : 15/002615 | |
| DATED | : November 14, 2017 | |
| INVENTOR(S) | : Wesley David Sacher and Joyce Kai See Poon | |

It is certified that error appears in the above-identified patent and that said Letters Patent is hereby corrected as shown below:

On the Title Page

Item "(71) Applicants: Huawei Technologies Canada Co., Ltd., Kanata (CA); The Governing Council of the University of Toronto, Toronto (CA)" should read
---(71) Applicants: The Governing Council of the University of Toronto, Toronto (CA)---.

In the Drawings

Sheet 4, Fig. 4, the first reference numeral "74A" should be ---74---.

In the Specification

Column 1, Line 32, "...of layers to from..." should be ---...of layers to form...---.

Column 4, Line 13, "...one or more include germanium..." should be ---...one or more germanium...---.

Column 4, Line 27, "...front-end-of line..." should be ---...front-end-of-line...---.

Column 5, Line 4, "...each disposed a different..." should be ---...each disposed at a different...---.

Column 5, Line 23 and 24, "...summarized as follows. In order..." should be ---...summarized as follows, in order...---.

Column 6, Line 16, "...sizes ratios and/or..." should be ---...sizes, ratios and/or...---.

Column 7, Line 6, "...To ensure a gradual enough width..." should be ---...To ensure an appropriate gradual width...---.

Column 7, Line 21, "...To ensure a gradual enough width..." should be ---...To ensure an appropriate gradual width...---.

Signed and Sealed this
Ninth Day of April, 2019

Andrei Iancu
*Director of the United States Patent and Trademark Office*